US012605681B2

(12) United States Patent
Folezzani et al.

(10) Patent No.: US 12,605,681 B2
(45) Date of Patent: Apr. 21, 2026

(54) CARTRIDGE AND A HOMOGENIZING VALVE COMPRISING SAID CARTRIDGE

(71) Applicant: GEA MECHANICAL EQUIPMENT ITALIA S.p.A., Parma (IT)

(72) Inventors: Matteo Folezzani, Parma (IT); Alfredo Ricci, Parma (IT)

(73) Assignee: GEA Mechanical Equipment Italia S.p.A., Parma (IT)

( * ) Notice: Subject to any disclaimer, the term of this patent is extended or adjusted under 35 U.S.C. 154(b) by 20 days.

(21) Appl. No.: 18/867,955

(22) PCT Filed: Oct. 26, 2023

(86) PCT No.: PCT/IB2023/060800
§ 371 (c)(1),
(2) Date: Nov. 21, 2024

(87) PCT Pub. No.: WO2024/161199
PCT Pub. Date: Aug. 8, 2024

(65) Prior Publication Data
US 2025/0164026 A1 May 22, 2025

(30) Foreign Application Priority Data
Feb. 1, 2023 (IT) ........................ 102023000001638

(51) Int. Cl.
*F16K 41/02* (2006.01)
*B01F 25/442* (2022.01)
(Continued)

(52) U.S. Cl.
CPC .......... *B01F 25/46* (2022.01); *B01F 25/4422* (2022.01); *F16K 27/02* (2013.01); *F16K 41/02* (2013.01)

(58) Field of Classification Search
CPC .... F16K 27/02; F16K 2200/501; F16K 41/02; F16K 41/04; F16K 25/02; F16K 3/243;
(Continued)

(56) References Cited

U.S. PATENT DOCUMENTS

| | | | |
|---|---|---|---|
| 3,521,891 A | 7/1970 | Joseph | |
| 4,480,842 A * | 11/1984 | Mahyera | ................ F16J 15/187 |
| | | | 277/516 |

(Continued)

FOREIGN PATENT DOCUMENTS

| | | | | |
|---|---|---|---|---|
| IT | 10-2009-901719304 A1 | 10/2010 | | |
| KR | 102735924 B1 * | 11/2024 | ............. | F16K 51/00 |

OTHER PUBLICATIONS

International Search Report and Written Opinion issued in PCT/IB2023/060800 on Jan. 17, 2024, 9 pages, European Patent Office, Rijswijk, Netherlands.

(Continued)

*Primary Examiner* — Marina A Tietjen
(74) *Attorney, Agent, or Firm* — Barnes & Thornburg; Tina M. Dorr

(57) ABSTRACT

A cartridge (1) for a homogenizing valve (100), the cartridge (1) including:
a deflector (2) having an elongated development;
a hollow case (3) having a cylindrical symmetry, the deflector (2) passing through the hollow case (3) so that at least a portion (2a) of the deflector (2) is inside the hollow case (3);
an annular guide (4) fitted between an inner wall (3a) of the hollow case (3) and the deflector (2).

19 Claims, 4 Drawing Sheets

(51) Int. Cl.
  B01F 25/46 (2022.01)
  F16K 27/02 (2006.01)

(58) Field of Classification Search
  CPC ........ F16K 5/0285; F16K 5/04; F16K 3/0227;
        B01F 2101/2204; B01F 25/4422; B01F
          25/46; B01F 25/1051; B01F 35/165;
          B01F 2101/07; B01F 2101/21; B01F
                                    2101/22
  USPC .......................................... 251/214; 277/510
  See application file for complete search history.

(56)                    References Cited

U.S. PATENT DOCUMENTS

| | | | | |
|---|---|---|---|---|
| 5,263,682 | A * | 11/1993 | Covert | .................. F16K 41/046 |
| | | | | 277/517 |
| 7,207,712 | B2 | 4/2007 | Kozyuk | |
| 11,698,147 | B2 * | 7/2023 | Hofman | ................ F16K 41/043 |
| | | | | 251/214 |
| 2004/0251635 | A1 * | 12/2004 | Ishida | ...................... F16J 15/18 |
| | | | | 277/510 |
| 2017/0097107 | A1 * | 4/2017 | Hotz | ........................ F16K 41/02 |
| 2022/0252181 | A1 * | 8/2022 | Garlock | ................. F16J 15/186 |

OTHER PUBLICATIONS

International Preliminary Report on Patentability (IPRP) issued in
PCT/IB2023/060800 on Jul. 16, 2024, 18 pages, European Patent
Office, Rijswijk, Netherlands.

\* cited by examiner

CARTRIDGE AND A HOMOGENIZING VALVE COMPRISING SAID CARTRIDGE

TECHNICAL FIELD

The present invention relates to a cartridge and a homogenizing valve comprising said cartridge.

BACKGROUND ART

The invention proposed here can be used in manufacturing areas where homogenization is a step of the production process.

Consider, for example, the production of carbon-based nanostructured materials, such as graphene and carbon nanotubes or cellular breakdown of yeasts, algae, or microorganisms for the production of intracellular material.

The invention can also be used in the food industry, in particular in the dairy sector, or in the chemical, pharmaceutical or cosmetic industry.

DISCLOSURE OF THE INVENTION

As it is well-known, an apparatus for homogenising fluids crushes the particles, reducing their dimensions to a minimum and make the dimensions of the particles uniform, thus reducing variation of distribution of the dimensions of the particles.

Said homogenising apparatus, also in the different embodiments so far known, comprises a high-pressure pump and a homogenising valve.

The homogenising valve comprises a first chamber receiving the fluid at high energy from the pump delivery and a second chamber capable of supplying outgoing back pressure. The homogenising action is obtained by forcing the fluid to pass through an interspace or gap with reduced dimensions afforded between the first and the second chamber.

The gap is defined by a radial collider integrally joined to the valve body and by a deflector axially mobile with respect to the radial collider.

A pusher capable of contrasting the pressure of the fluid in an axial direction is applied to the deflector. The dimension of the gap is controlled by acting directly on the pusher as a function of the valve flow rate and pressure operating values.

The energy of the fluid decreases due to passing through the gap, according to Bernoulli's principle.

A main disadvantage of the solutions just described lies in the reduced useful lifetime of the components, particularly those subject to high pressures, i.e., the deflector.

In applications with fibrous fluids, the useful lifetime of components is further reduced by the abrasiveness of the fluids themselves, which means that the components exposed to transit of the fluids wear out more rapidly and must be replaced with greater frequency.

Replacing the deflector requires specific tools. In addition, other components need to be extracted for accessing the deflector. The operations may be long and complicated.

Documents U.S. Pat. No. 7,207,712 B2 and IT PR20090023 A1 disclose a cartridge according to the preamble of claim 1.

In this context, the object of the present invention is to provide a cartridge and a homogenizing valve, which overcome the problems of the prior art cited above.

The object of the present invention is proposing a cartridge having an increased lifetime than the known solutions.

Another object of the present invention is presenting a cartridge that may be easily replaced within a homogenizing valve.

Another object of the present invention is proposing a homogenising valve which has easier maintenance with respect to the known solutions.

The stated technical task and specified aims are substantially achieved by a cartridge for a homogenizing valve, the cartridge comprising:

a deflector having an elongated development;

a hollow case having a cylindrical symmetry, said deflector passing through the hollow case so that at least a portion of the deflector is inside the hollow case;

an annular guide fitted between an inner wall of the hollow case and the deflector.

Preferably, the annular guide is made of plastic material.

According to one aspect of the invention, the hollow case is coaxial to the deflector.

According to one embodiment of the invention, the hollow case comprises a tubular body and a hollow plug applied at a first end of the tubular body.

In particular, the hollow plug has a plurality of first holes.

According to one embodiment of the invention, the tubular body has a second end that is inwardly bent so as to define an annular base through which the deflector is received.

In particular, the annular base has a plurality of second holes.

Preferably, the first holes have a larger diameter than second holes.

According to one embodiment of the invention, the cartridge further comprises a first ring and a second ring arranged inside the hollow case and around the deflector. The annular guide is interposed between the first ring and the second ring.

For example, the first ring and the second ring are made of PEEK.

Preferably, the hollow case is made of anti-friction steel.

The stated technical task and specified aims are substantially achieved by a homogenizing valve comprising:

an inlet for fluid at high energy;

an outlet for homogenized fluid at low energy;

a radial collider;

a cartridge according to the present invention, wherein the deflector is movable with respect to the radial collider so as to define a gap therebetween.

BRIEF DESCRIPTION OF DRAWINGS

Further characteristics and advantages of the present invention will more fully emerge from the non-limiting description of a preferred but not exclusive embodiment of a cartridge and of a homogenizing valve, as illustrated in the accompanying drawings in which.

DETAILED DESCRIPTION OF PREFERRED EMBODIMENTS OF THE INVENTION

Figure 1:
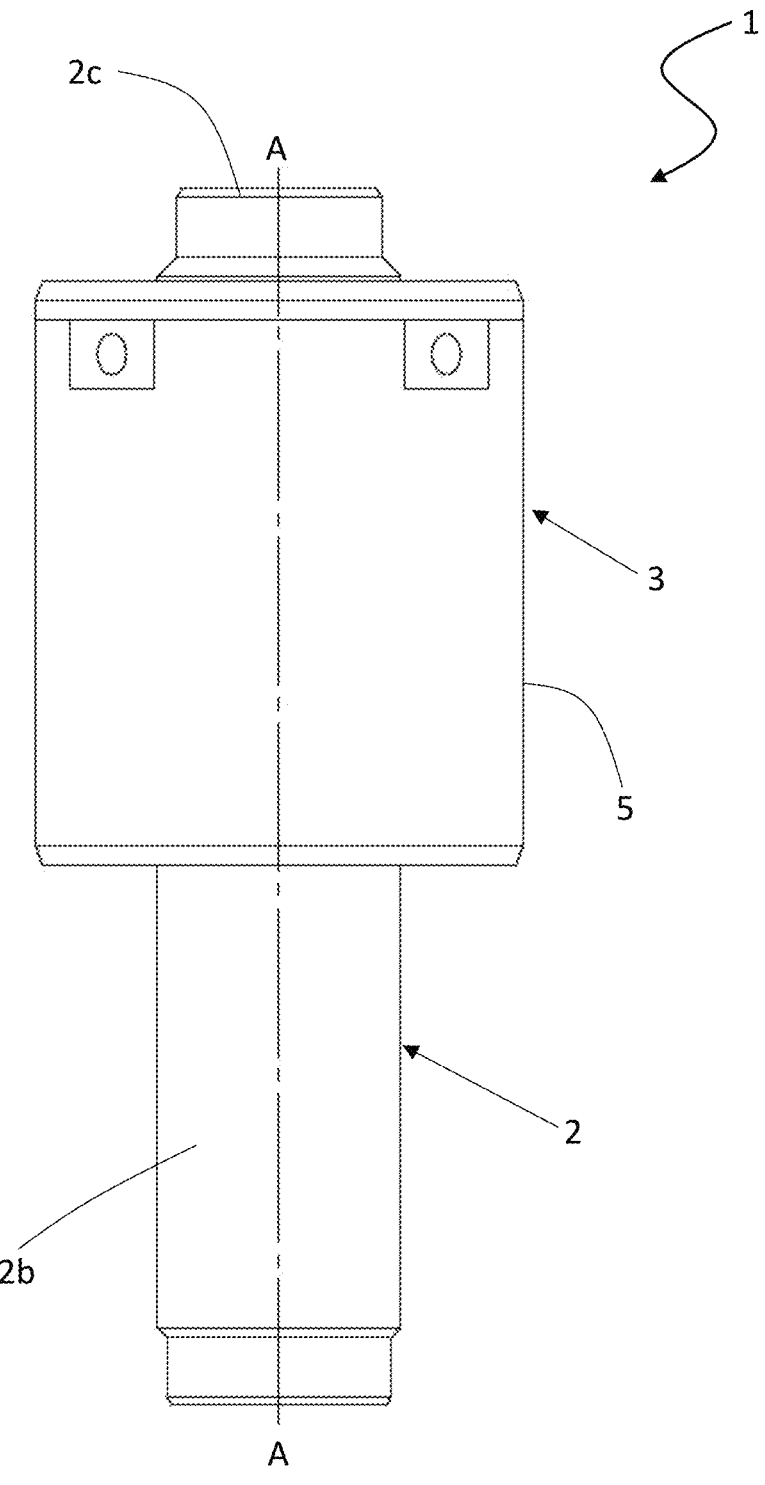
FIG. 1 illustrates a cartridge for a homogenizing valve, according to the present invention, in a front view.
Figure 2:
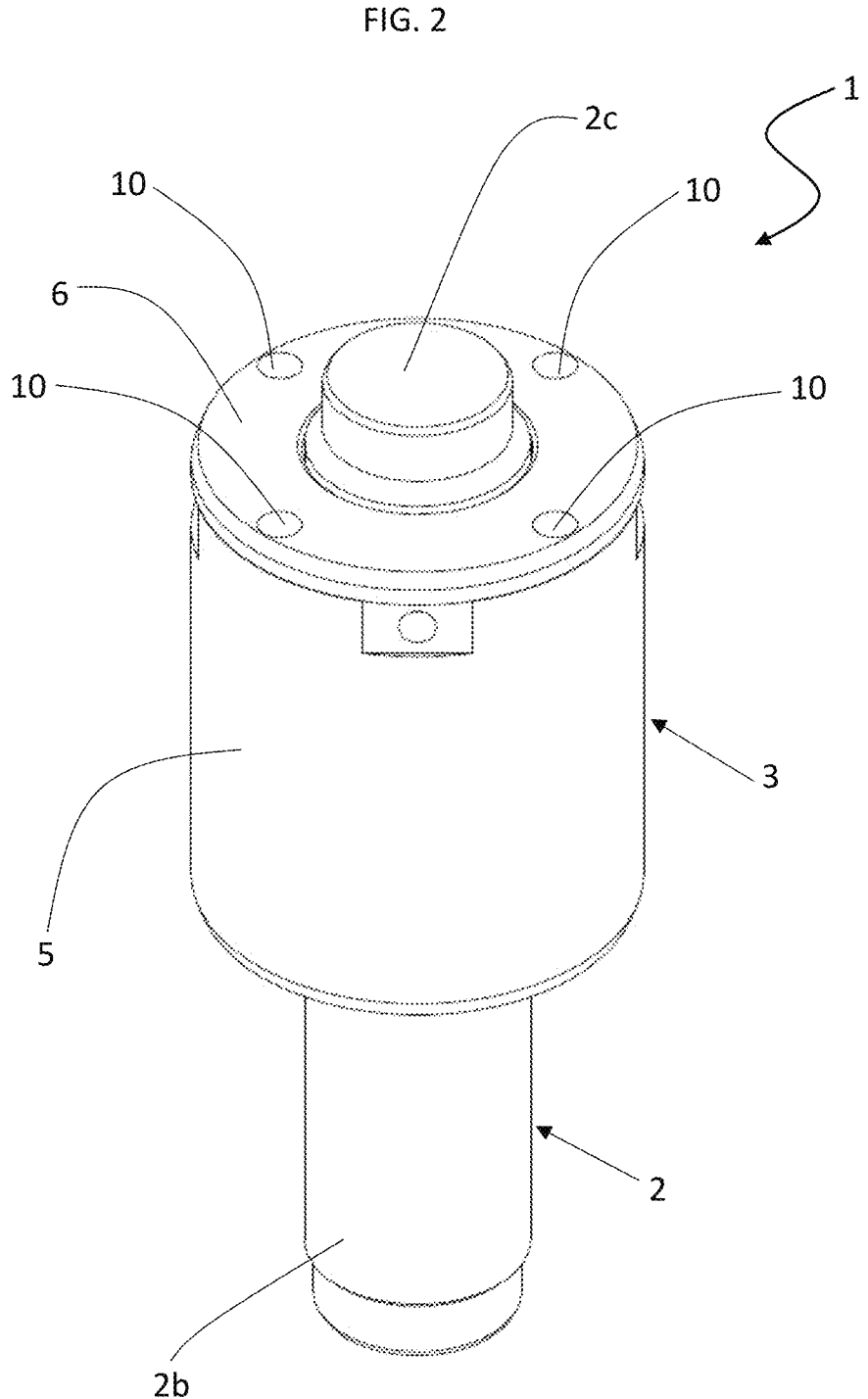
FIG. 2 illustrates the cartridge of FIG. 1, in a perspective view.
Figure 3:
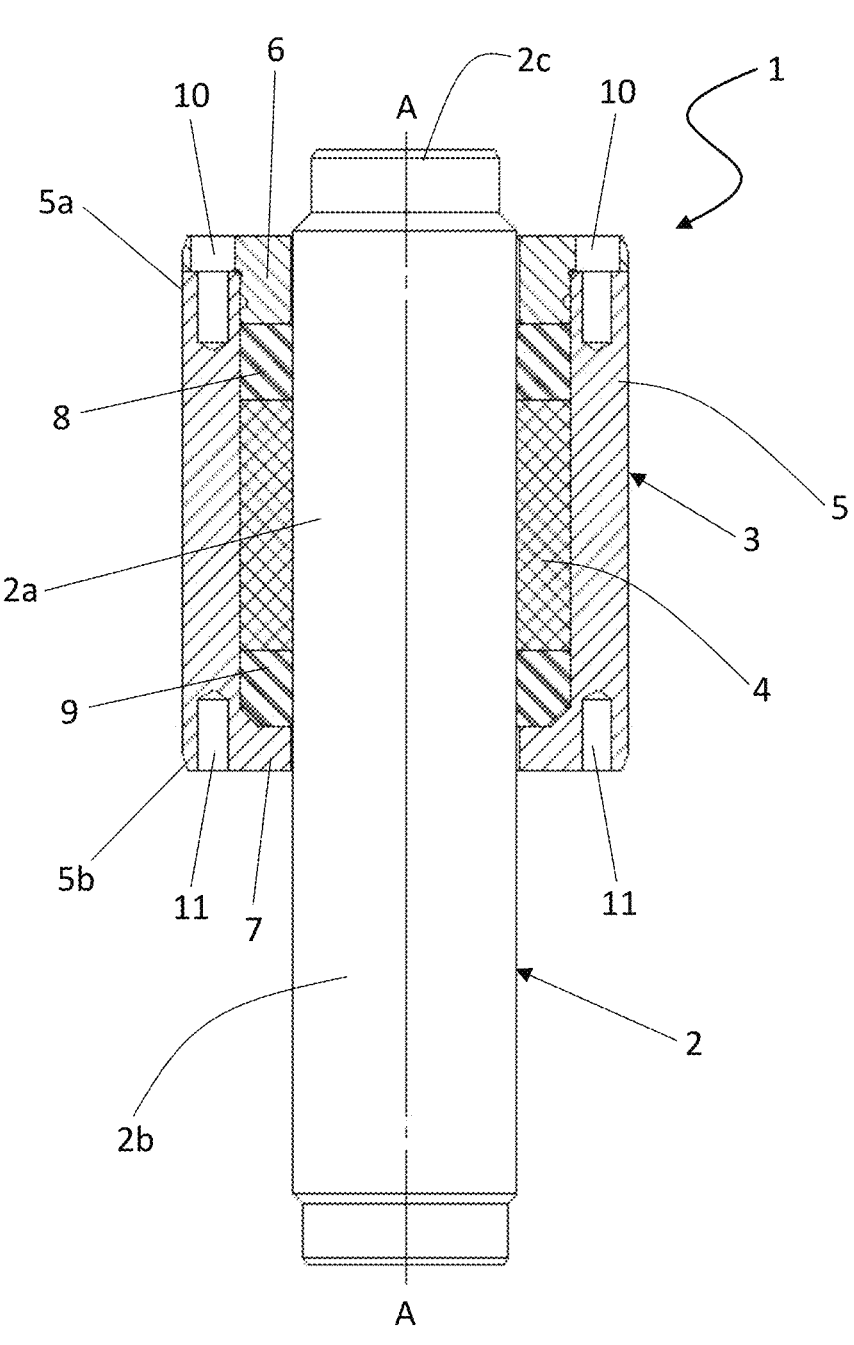
FIG. 3 illustrates the cartridge of FIG. 1, in a cross-sectional view.
Figure 4:
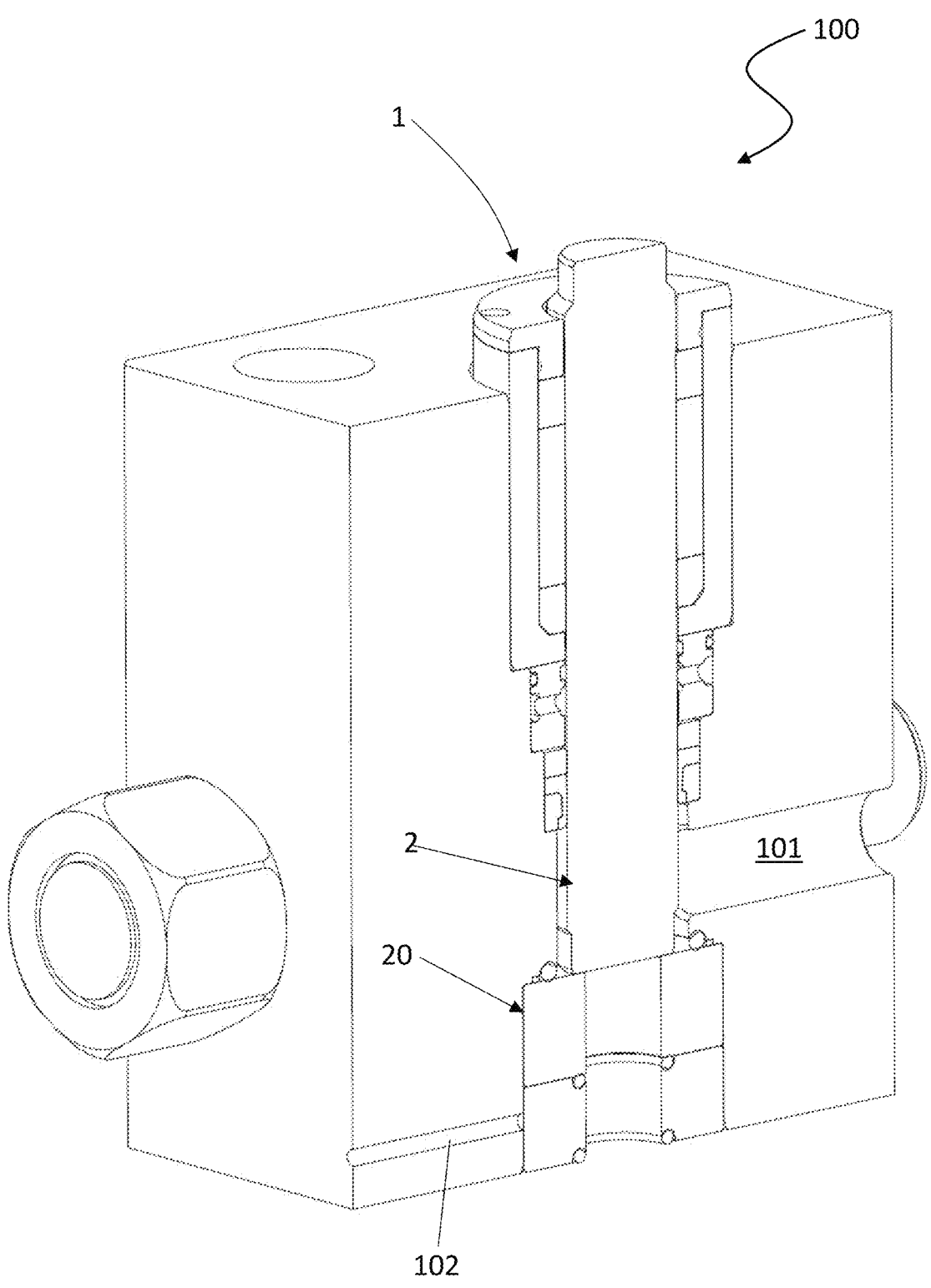
FIG. 4 illustrates a homogenizing valve, according to the present invention, in a sectional view.

With reference to the figures, number 1 indicates a cartridge for a homogenizing valve 100.

The cartridge 1 comprises a deflector 2 having an elongated development. In particular, the deflector 2 has a cylindrical symmetry with respect to a longitudinal axis AA.

The cartridge 1 further comprises a hollow case 3 having a cylindrical symmetry so as to receive the deflector 2.

In particular, the hollow case 3 is coaxial to the deflector 2.

In addition, the hollow case 3 is coaxial to a radial collider 20, that will be detailed better below.

The deflector 2 is arranged within the hollow case 3 so as to pass through it. At least a portion 2a of the deflector 2 is inside the hollow case 3. This portion, indicated with 2a, is referred to as "inner portion" of the deflector 2. The rest of the deflector 2 is outside the hollow case 3.

In particular, a first end portion 2b of the deflector 2 and a second end portion 2c of the deflector 2 protrude outside the hollow case 3.

An annular guide 4 is fitted between an inner wall 3a of the hollow case 3 and the deflector 2.

In particular, the annular guide 4 is interposed between the inner wall 3a of the hollow case 3 and the inner portion 2a of the deflector 2.

According to one aspect of the invention, the annular guide 4 is made of plastic and elastic material. For example, the annular guide 4 is made of PTFE.

According to an embodiment of the invention, the hollow case 3 comprises a tubular body 5 and a hollow plug 6 applied at a first end 5a of the tubular body 5.

The hollow plug 6 consists in a hollow disk.

The tubular body 5 has a second end 5b that is inwardly bent so as to define an annular base 7 through which the deflector 2 is arranged.

The annular base 7 and the hollow plug 6 constitute two hollow discoidal bases of the hollow case 3.

The tubular body 5 is made of a single piece.

Preferably, the tubular body 5 is made of anti-friction steel.

In particular, the deflector 2 is coaxial to the tubular body 5.

The hollow plug 6 is made of the same material of the tubular body 5, preferably of anti-friction steel.

Anti-friction steel or another anti-friction metal is useful to avoid sticking with other steel components of the homogenizing valve 100.

The cartridge 1 further comprises at least two rings 8, 9 arranged inside the hollow case 3 and around the inner portion 2a of the deflector 2.

In particular, a first ring 8 is arranged inside the hollow case 3 in contact with an inner surface of the hollow plug 6.

A second ring 9 is arranged inside the hollow case 3 in contact an inner surface of the annular base 7.

The annular guide 4 is interposed between the first ring 8 and the second ring 9.

In particular, the two rings 8, 9 are made of an anti-friction material.

Preferably, the two rings 8, 9 are made of PEEK.

The rings 8, 9 are dimensioned so as to maintain the annular guide 4 in position within the tubular body 5, avoiding it to slide inside the tubular body 5. In particular, the rings 8, 9 are made of a material that is more rigid than the material composing the annular guide 4, which is preferably a viscoelastic material.

Thus, the deflector 2 is maintained coaxial to the tubular body 5.

According to one aspect of the invention, the hollow plug 6 has a plurality of first holes 10.

In particular, all the first holes 10 are identical.

For example, the first holes 10 are blind holes.

In the illustrated embodiment, there are four blind holes 4 equally spaced along the circumferential development of the hollow plug 6.

According to one aspect of the invention, the annular base 7 has a plurality of second holes 11.

In particular, all the second holes 11 are identical.

For example, the second holes 11 are blind holes.

In the illustrated embodiment, there are four blind holes 11 equally spaced along the circumferential development of the annular base 7.

Preferably the diameter of the first holes 10 is larger than the diameter of the second holes 11.

According to the invention, a homogenizing valve 100 comprises:

an inlet 101 for fluid at high energy;
an outlet 102 for homogenized fluid at low energy;
a radial collider 20;
a cartridge 1 according to the present invention.

A gap is obtained between the radial collider 20 and the deflector 2 of the cartridge 1.

The deflector 2 is movable with respect to the radial collider 20, for example by means of a pneumatic cylinder or the like.

As said, the deflector 2 is partially arranged in the hollow case 3, which is designed as a reversible component.

Indeed, the axial symmetry of the cartridge 1 allows revers it within the homogenizing valve 100. In fact, the cartridge 1 can be turned upside down so that a different end portion of the deflector 2 may be used to create the gap.

For example, when the first end 2a of the deflector 2 is worn, the cartridge is extracted from the injection chamber, it is turned upside down and the second end 2b of the deflector 2 can be used for creating the gap with the radial collider 20.

The cartridge 1 can be easily extracted thanks to the holes 10, 11 (of the hollow plug 6 or the annular base 7), that allow the insertion of screws or other extracting tools.

The characteristics of the cartridge and of the homogenizing valve according to the present invention, are clear, as are the advantages.

In particular, upon reaching a certain degree of wear of the deflector, the cartridge is extracted, reversed, and relocated inside the homogenizing valve. In addition, when the deflector is fully worn (on both sides), the cartridge can be easily replaced.

In addition, the cartridge is assembled so as to assure an adequate pre-compression of the elastic-plastic (viscoelastic) material that composes the annular guide.

The invention claimed is:

1. A cartridge (1) for a homogenizing valve (100), said cartridge (1) comprising:

a deflector (2) having an elongated development;
a hollow case (3) having a cylindrical symmetry, said deflector (2) passing through said hollow case (3) so that at least a portion (2a) of the deflector (2) is inside the hollow case (3), said hollow case (3) comprising a tubular body (5) and a hollow plug (6) applied at a first end (5a) of the tubular body (5) and having a plurality of first holes (10), the tubular body (5) having a second end (5b) that is inwardly bent so as to define an annular base (7) through which the deflector (2) is received;

an annular guide (4) fitted between an inner wall (3a) of the hollow case (3) and the deflector (2), characterized in that the annular base (7) has a plurality of second holes (11), said first holes (10) having a larger diameter than the second holes (11).

2. The cartridge (1) according to claim 1, wherein the hollow case (3) is coaxial to said deflector (2).

3. The cartridge (1) according to claim 2, wherein said annular guide (4) is made of plastic material.

4. The cartridge (1) according to claim 2, further comprising a first ring (8) and a second ring (9) arranged inside said hollow case (3) and around the deflector (2), the annular guide (4) being interposed between the first ring (8) and the second ring (9).

5. The cartridge (1) according to claim 2, wherein said hollow case (3) is made of anti-friction steel.

6. A homogenizing valve (100) comprising:

an inlet (101) for fluid at high energy;

an outlet (102) for homogenized fluid at low energy;

a radial collider (20);

a cartridge (1) according to claim 2, wherein said deflector (2) is movable with respect to the radial collider (20) so as to define a gap therebetween.

7. The cartridge (1) according to claim 1, wherein said annular guide (4) is made of plastic material.

8. The cartridge (1) according to claim 7, further comprising a first ring (8) and a second ring (9) arranged inside said hollow case (3) and around the deflector (2), the annular guide (4) being interposed between the first ring (8) and the second ring (9).

9. The cartridge (1) according to claim 7, wherein said hollow case (3) is made of anti-friction steel.

10. A homogenizing valve (100) comprising:

an inlet (101) for fluid at high energy;

an outlet (102) for homogenized fluid at low energy;

a radial collider (20);

a cartridge (1) according to claim 7, wherein said deflector (2) is movable with respect to the radial collider (20) so as to define a gap therebetween.

11. The cartridge (1) according to claim 1, further comprising a first ring (8) and a second ring (9) arranged inside said hollow case (3) and around the deflector (2), the annular guide (4) being interposed between the first ring (8) and the second ring (9).

12. The cartridge (1) according to claim 11, wherein the first ring (8) and the second ring (9) are made of PEEK.

13. The cartridge (1) according to claim 12, wherein said hollow case (3) is made of anti-friction steel.

14. A homogenizing valve (100) comprising:

an inlet (101) for fluid at high energy;

an outlet (102) for homogenized fluid at low energy;

a radial collider (20);

a cartridge (1) according to claim 12, wherein said deflector (2) is movable with respect to the radial collider (20) so as to define a gap therebetween.

15. A homogenizing valve (100) comprising:

an inlet (101) for fluid at high energy;

an outlet (102) for homogenized fluid at low energy;

a radial collider (20);

a cartridge (1) according to claim 11, wherein said deflector (2) is movable with respect to the radial collider (20) so as to define a gap therebetween.

16. The cartridge (1) according to claim 11, wherein said hollow case (3) is made of anti-friction steel.

17. The cartridge (1) according to claim 1, wherein said hollow case (3) is made of anti-friction steel.

18. A homogenizing valve (100) comprising:

an inlet (101) for fluid at high energy;

an outlet (102) for homogenized fluid at low energy;

a radial collider (20);

a cartridge (1) according to claim 17, wherein said deflector (2) is movable with respect to the radial collider (20) so as to define a gap therebetween.

19. A homogenizing valve (100) comprising:

an inlet (101) for fluid at high energy;

an outlet (102) for homogenized fluid at low energy;

a radial collider (20);

a cartridge (1) according to claim 1, wherein said deflector (2) is movable with respect to the radial collider (20) so as to define a gap therebetween.

* * * * *